(12) United States Patent
Mandica et al.

(10) Patent No.: US 6,190,161 B1
(45) Date of Patent: Feb. 20, 2001

(54) GAS APPLIANCE SUCH AS A THERMAL WEED SPRAYER

(75) Inventors: Franck Mandica, Saint Genis Laval; Dominique Fontaine, Sainte Foy les Lyon, both of (FR)

(73) Assignee: Application des Gaz (FR)

( * ) Notice: Under 35 U.S.C. 154(b), the term of this patent shall be extended for 0 days.

(21) Appl. No.: 09/446,659

(22) PCT Filed: Jun. 15, 1998

(86) PCT No.: PCT/IB98/00935

§ 371 Date: Dec. 22, 1999

§ 102(e) Date: Dec. 22, 1999

(87) PCT Pub. No.: WO98/59199

PCT Pub. Date: Dec. 30, 1998

(30) Foreign Application Priority Data

Jun. 23, 1997 (FR) .................................................. 97 08068

(51) Int. Cl.[7] ....................................................... F23Q 7/12
(52) U.S. Cl. ............................................. 431/255; 431/258
(58) Field of Search ..................................... 431/255, 264, 431/265, 266, 258, 344; 126/401, 407, 412, 414

(56) References Cited

U.S. PATENT DOCUMENTS

| | | | |
|---|---|---|---|
| 4,292,021 | * | 9/1981 | Miyagawa ............................ 431/255 |
| 4,526,532 | | 7/1985 | Nelson . |
| 4,666,399 | | 5/1987 | Nelson . |
| 5,123,837 | * | 6/1992 | Farnham et al. ..................... 431/264 |
| 5,626,471 | | 5/1997 | Howie et al. . |

FOREIGN PATENT DOCUMENTS

| | | |
|---|---|---|
| 0 415 824 | 3/1991 | (EP) . |
| 0 821 197 | 1/1998 | (EP) . |

* cited by examiner

Primary Examiner—James C. Yeung
(74) Attorney, Agent, or Firm—Kramer Levin Naftalis & Frankel LLP

(57) ABSTRACT

A piezoelectrically-ignited gas appliance comprises a fuel regulator assembly, a burner assembly attached to the fuel regulator assembly, and a piezoelectric ignition assembly partially within the burner assembly. The burner assembly includes a transfer pipe assembly, an air/fuel mixing assembly, and a combustion assembly. The transfer pipe assembly has a proximal end attached to the air/fuel mixing assembly and a distal end attached to the combustion assembly. The an air/fuel mixing assembly has an air opening formed at the proximal end and a fuel injector formed within the proximal end and in fluid communication with the fuel regulator assembly. The combustion assembly has a combustion nozzle and combustion flange attached to the distal end. The piezoelectric ignition assembly includes an piezoelectric charge generator coupled by a thermally and electrically-insulated, semi-rigid conductive wire within the transfer pipe assembly to an electrode. The electrode has a stripped tip protruding from a terminal branch midway along the transfer pipe assembly. Prior to forming the terminal branch, the wire forms a bent part having at least two bends bracing the wire against the transfer pipe assembly. The terminal branch extends away from the transfer pipe assembly so as to properly distance the stripped tip from the transfer pipe assembly between 4 mm and 6 mm, preferably at a distance 5 mm. The appliance may comprise a thermal weed sprayer for burning weeds.

12 Claims, 1 Drawing Sheet

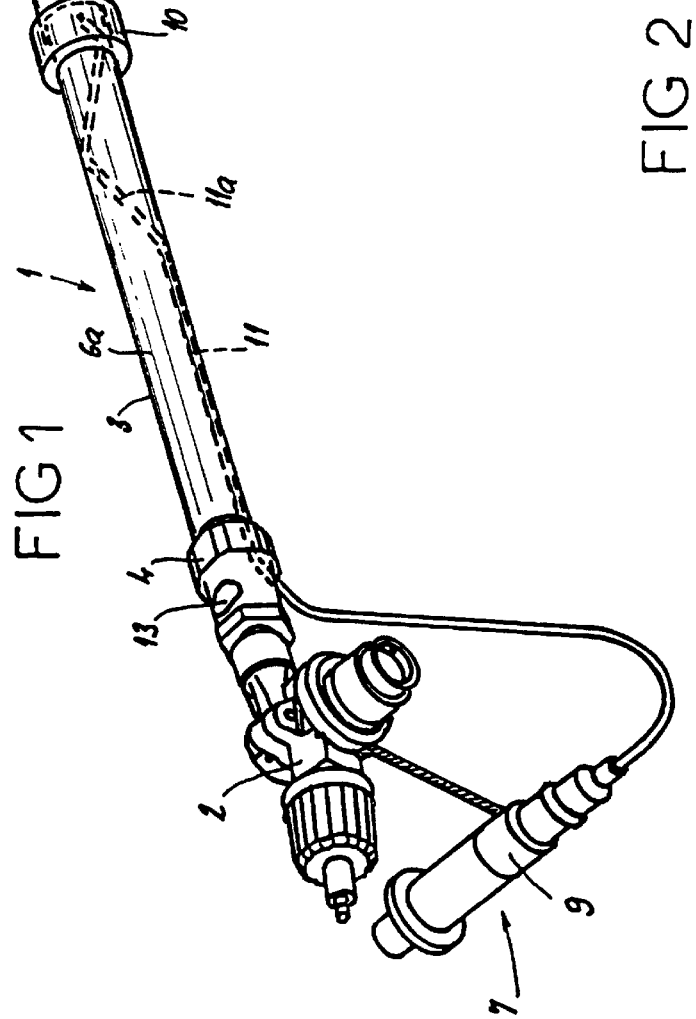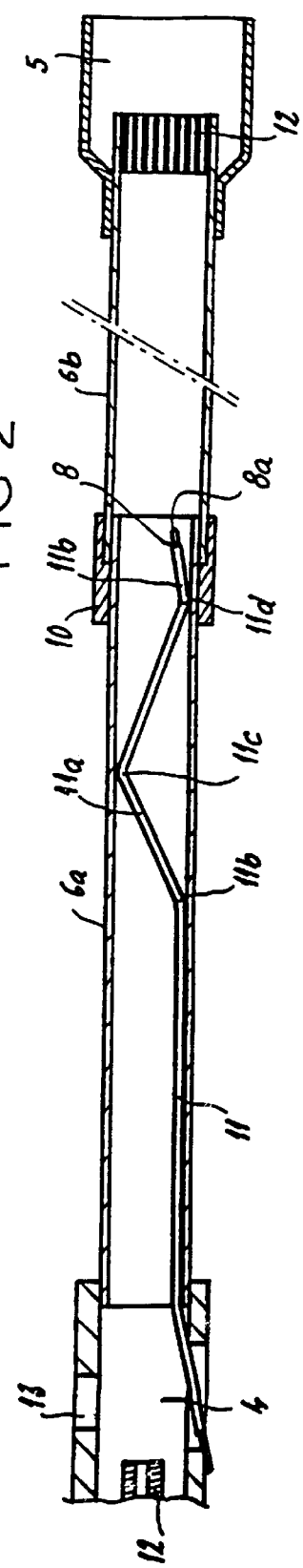

GAS APPLIANCE SUCH AS A THERMAL WEED SPRAYER

CROSS-REFERENCE TO RELATED APPLICATION

The present application is related to and seeks priority for related information from PCT International Application No. PCT/IB98/00935, International Publication No. WO 98/59199, entitled APPAREIL A GAZ DU TYPE DESHERBEUR THERMIQUE, filed on Jun. 15, 1998, having a priority of date of Jun. 23, 1997 from French Patent Application No. 97/08068. The present application incorporates these related applications by reference in their entireties.

1. Field of the Invention

The present invention relates to gas combustion appliances, in particular electric ignition systems of gas torch appliances, such as flame throwers used in burning weeds.

2. Background Information

Gas combustion appliances such as blowtorches and flame throwers are well-known in the art. Publication EP-A-0 415 824 describes one such blowtorch for use in welding as comprising a fuel gas flow control device, a burner, and a piezoelectric ignition. The fuel gas control device may be, for example, a pressure-reducing valve. The burner may include an air/fuel mixer for the introduction of oxidizing air into the controlled flow of fuel gas, a metal pipe for transferring the air/fuel mixture, and a combustion device for burning the air/fuel mixture. The piezoelectric ignition may include a grounded piezoelectric generator coupled by an insulated wire to an electrode that is next to but offset from the metal pipe.

Traditionally, the electrode constitutes a part or component whose installation requires accurate positioning, because beyond the discharge distance, no ignition of the combustible mixture occurs. The accurate positioning of the electrode during installation may require, on the one hand, one or more precision-machined parts, and on the other hand, a controlled assembly operation.

SUMMARY OF THE INVENTION

The present invention relates to gas combustion appliances having piezoelectric ignition systems, such as flame throwers used in burning weeds. In particular, the subject of the present invention is a piezoelectric ignition assembly that is particularly simple in its construction and in its layout, but nonetheless facilitates the precise positioning required for the electrode. An exemplary embodiment of the electrode according to the present invention comprises a stripped end formed by and arranged at the end of a semi-rigid electric wire located inside a transfer pipe, the wire having been shaped to form a bent part braced inside the pipe and a terminal branch that diverges from the transfer pipe to leave a predetermined discharge distance between the stripped end and the pipe.

Moreover, a preferred embodiment of a gas appliance according to the present invention includes a fuel gas flow control device, a burner assembly, and a piezoelectric ignition assembly. The fuel gas flow control device comprises a fuel regulator valve assembly. The burner assembly includes a transfer pipe assembly having an assembly proximal end and an assembly distal end, an air/fuel mixing assembly at the assembly proximal end, and a combustion nozzle at the assembly distal end. The transfer pipe assembly has an inner tube at the assembly proximal end and an outer tube at the assembly distal end. The piezoelectric ignition assembly includes a grounded piezoelectric generator coupled by a thermally and electrically insulated, semi-rigid electric wire to an electrode comprising a stripped end of the wire arranged inside and at a distal end of the inner tube, the wire having been shaped to form a bent part braced inside the pipe and a terminal branch that diverges from the inner tube to leave a predetermined discharge distance between the stripped end and the inner tube.

In addition, the outer tube preferably has a length adapted to a maximal path of inflammation at the moment of ignition of the burner, to facilitate transferring a flame forward from the proximal end of the outer tube to the combustion nozzle and thereby lighting the nozzle. Furthermore, the outer tube can be made to telescopically slide over the inner tube to vary the length of the transfer pipe assembly. Thanks to the arrangement of the assemblies of the present invention, it is therefore possible to vary the length of the transfer pipe assembly without the piezoelectric ignition assembly hampering the sliding of the outer tube over the inner tube, and at the same time ensuring piezoelectric ignition independent of the effective length of the transfer pipe assembly.

BRIEF DESCRIPTION OF THE DRAWINGS

FIG. 1 depicts, in perspective, the functional part of a gas appliance in accordance with the present invention, except for and not including its other member or components, which include the cover and the chassis.

FIG. 2 depicts a sectional view through the burner belonging to the gas appliance depicted in FIG. 1.

Other features and advantages of the present invention will be apparent from the following description of the exemplary embodiments thereof, and from the claims.

DETAILED DESCRIPTION

Referring to both FIGS. 1 and 2, a functional part of an exemplary embodiment of a gas appliance in accordance with the present invention is depicted separate from other functional components, which include the cover and the chassis. As shown in FIG. 1 and in accordance with the invention, a gas appliance 1 such as of a thermal weedkiller type may comprise a fuel regulator assembly, a burner assembly, and a piezoelectric ignition assembly.

The fuel regulator assembly 2 may include a fuel intake port 2a for taking pressurized fuel gas (not depicted), such as pressurized butane, for example, from a fuel source (also not depicted). The gas may be supplied from a source which is independent of the appliance 1 such as, for example, a gas reservoir, or a source which is connected to the gas appliance 1, e.g., a container, which may or may not be a use-once container, such as, for example, a cartridge connected to the gas appliance 1. Fuel regulator assembly 2 also includes a fuel gas flow control device 2b, which may have a valve mechanism, such as a simple tap, separating the fuel intake port 2a from a fuel output port (not shown) and controlling the flow of gas to the rest of gas appliance 1.

Moreover, gas appliance 1 comprises a burner assembly 3 attached to the fuel regulator assembly 2 that channels the fuel gas to combustion. Burner assembly 3 may include an air/fuel mixing assembly 4, a combustion assembly 5, and a transfer pipe assembly 6.

The air/fuel mixing assembly 4 includes a fuel injector 12, in fluid communication with the fuel regulator assembly 2, and an opening 13, as shown in FIG. 2. As fuel injector 12 injects a jet of fuel gas (not shown) into the transfer pipe assembly 6, the jet of fuel gas entrains a stream of primary, oxidizing air (not shown) entering through opening 13, mixing primary, oxidizing air in with the controlled flow of fuel gas.

The combustion assembly 5 includes a combustion flange 5a and a combustion nozzle 5b. Combustion assembly 5 guides the air/fuel mixture as the air/fuel mixture exits the transfer pipe assembly 6 and combusts with secondary air in an open flame.

The transfer pipe assembly 6 has an assembly proximal end, attached to the air/fuel mixing assembly 4, and an assembly distal end, attached to the combustion assembly 5. The transfer pipe assembly may include a single pipe or tube for a fixed-length assembly. Alternatively, two or more pipes or tubes may be used. The use of multiple pipes may enable a variable-length assembly. For example, multiple pipes may be connected end-to-end and extend from the assembly proximal end to the assembly distal end. Detaching one of the pipes would shorten the transfer pipe assembly 6. Alternatively, if the pipes or tubes are of staggered diameters, the pipes may telescopically collapse as one pipe slides over the other to vary the length of transfer pipe assembly 6.

FIGS. 1 and 2 depict a transfer pipe assembly 6 having two telescopic pipes, an inner pipe 6a at the assembly proximal end and an outer pipe 6b at the assembly distal end, held in place by a telescopic brace 10. The inner pipe 6a has an inner proximal end and an inner distal end, whereas the outer pipe 6b has an outer proximal end and an outer proximal end. The telescopic brace 10 holds the outer proximal end in place relative to the inner distal end, and telescopic brace 10 may be loosened temporarily to permit outer pipe 6b to slide over inner pipe 6a.

When the outer pipe 6b is fully extended over inner pipe 6a, the transfer pipe assembly 6 is at a maximum length. To functionally accommodate the maximum length, the outer pipe 6b preferably has a length adapted to a maximal path of inflammation at the moment of ignition of the burner assembly 3, to facilitate transferring a flame forward from the outer proximal end to the combustion assembly 5 and thereby lighting the nozzle 5b. Note that the inner pipe 6a has an inner pipe diameter and the outer pipe has an outer pipe diameter, and that the maximal path of inflammation depends in part on inner pipe diameter and the outer pipe diameter.

With the relationship of the inner and outer pipe diameters to the maximal path of inflammation in mind, the inner pipe diameter and the outer pipe diameter should be narrow enough to create a situation in which the air/fuel mixture travels through the transfer pipe assembly 6 faster than the air/fuel mixture can ignite at the moment of ignition of the burner assembly 3, reducing the risk that the flame might travel backward through the transfer pipe assembly 6.

Referring in particular to FIG. 2, the internal aspects of gas appliance 1 are readily comprehensible. As stated above, gas appliance 1 comprises a piezoelectric ignition assembly 7 partially within burner assembly 3 for igniting the air/fuel mixture for combustion. The piezoelectric ignition assembly 7 includes an electrode 8 and a grounded piezoelectric generator 9 connected to the electrode 8 by a semi-rigid electrically-conductive wire 11. The semi-rigid wire 11 enters the inner pipe 6a at the inner proximal end and penetrates the inner pipe 6a until forming the electrode 8 near the inner distal end. The semi-rigid wire 11 is thermally and electrically insulated by a heat-resistant sheath, which, for example, may be made of silicone.

As shown in FIG. 2, wire 11 may form a bent part 11a braced inside the inner pipe 6a. The bent part 11a may include two or more bends, such as three bends 11b, 11c, and 11d, as depicted in FIG. 2. Bends 11b, 11c, and 11d are respectively and successively made in opposite directions, causing the bends 11b, 11c, 11d, to brace the wire 11 against the inner pipe 6a at three points of contact corresponding to bends 11b, 11c, and 11d. Bends 11b and 11d form end points of the bent part 11a, while bend 11c forms an intermediate point of bent part 11a.

Extending from the bend 11d of FIG. 2 is a terminal branch 11e of the wire 11. The terminal branch 11e lies near the inner distal end and diverges slightly from the inner pipe 6a. The terminal branch 11e terminates at a stripped tip 8a that conducts an electrical spark from the electrode 8 to the inner pipe 6a when the stripped tip 8a is properly spaced from the inner pipe 6a by a predetermined discharge distance. Using the bends 11b, 11c, and 11d to stabilize the wire 11 within the inner pipe 6a is particularly beneficial in that the bent part 11a provides a simple yet effective method to fix the stripped end 8a at a critical and precise discharge distance to the inner pipe 6a.

Preferably, the predetermined discharge distance is between 4 mm and 6 mm for a standard strength piezoelectric charge generator. The preferred discharge distance is 5 mm. If the discharge distance is too short, i.e., below 4 mm, an electric spark is generated that is not strong enough to ignite the gas. Conversely, if the discharge distance is too long, i.e., above 6 mm, a standard-strength piezoelectric charge generator likely will fail to generate an electrical potential great enough to create any electrical spark between the stripped end 8a and the inner pipe 6a.

The devices described herein are meant to be exemplary of the present invention and not exhaustive. Other appliances or devices may be adapted in accordance with the present invention, including flame throwers, blowtorches, welding torches, gas heaters, and gas stoves. The embodiment of the present invention in a thermal weed sprayer is purely exemplary.

A number of embodiments of the present invention have been described above. Nevertheless, it will be understood that various modifications may be made without departing from the spirit and scope of the invention. Accordingly, other embodiments may be within the scope of the following claims. It is intended that all matter contained in the above description or shown in the accompanying drawings shall be interpreted as illustrative and not in a limiting sense. It is also understood that the following claims are intended to cover all of the generic and specific features of the invention herein described and all statements of the scope of the invention, expressed or implied.

What is claimed is:

1. A piezoelectrically-ignited gas appliance comprising:
    a fuel regulator assembly having a fuel intake port removably attachable to a source of fuel, a fuel output port, and a valve mechanism separating the fuel intake port and fuel output port;
    a burner assembly including
        a transfer pipe assembly having a proximal end and a distal end,
        an air/fuel mixing assembly having an air opening formed at the proximal end and a fuel injector formed at the fuel output port within the proximal end, and
        a combustion assembly having a combustion nozzle and a combustion flange attached to the distal end; and a piezoelectric ignition assembly including a piezoelectric charge generator coupled by a thermally and electrically-insulated, semi-rigid conductive wire within the transfer pipe assembly to an electrode having a stripped tip protruding from a terminal branch midway along the transfer pipe assembly, the generator and burner assembly being electrically grounded, the wire forming a bent part having at least two bends bracing the wire against the transfer pipe assembly prior to forming the terminal branch, the terminal branch extending away from the transfer pipe assembly so as to properly distance the stripped tip from the transfer pipe assembly.

2. The appliance according to claim 1, wherein the bent part includes a first bend, a second bend and a third bend, the first bend angling the wire toward a first opposing surface of the inner pipe, the second bend angling the wire away from the first opposing surface towards a second opposing surface of the inner pipe, and the third bend angling the wire away from the second opposing surface towards a third opposing surface of the inner pipe, the first, second and third bends forming respectively a first point of contact, a second point of contact, and a third point of contact, the first, second and third points of contact bracing the wire respectively against the first, second and third opposing surfaces.

3. The appliance according to claim 1, wherein the transfer pipe assembly includes an inner pipe and an outer pipe overlaying the inner pipe, the inner pipe having an inner proximal end attached to the fuel regulator assembly and an inner distal end attached to the outer pipe, the outer pipe having an outer distal end and an outer proximal end attached to the inner distal end.

4. The appliance according to claim 3, wherein the outer pipe has a length adapted to a maximal path of inflammation at the moment of ignition of the burner assembly, to facilitate transferring a flame forward from the outer proximal end to the combustion nozzle and thereby lighting the nozzle.

5. The appliance according to claim 3, wherein the outer pipe slidably overlays the inner pipe, the outer proximal end of the outer pipe being held against the inner distal end of the inner pipe by a telescopic brace.

6. The appliance according to claim 3, wherein the inner pipe has an inner pipe diameter and the outer pipe has an outer pipe diameter, the inner pipe diameter and the outer pipe diameter being narrow enough to create a situation in which an air/fuel mixture travels through the transfer pipe assembly faster than the air/fuel mixture can ignite at the moment of ignition of the burner assembly.

7. The appliance according to claim 1, wherein the stripped tip is a distance of between 4 mm and 6 mm from the transfer pipe assembly.

8. The appliance according to claim 7, wherein the stripped tip is 5 mm from the transfer pipe assembly.

9. The appliance according to claim 1, wherein the appliance further comprises a thermal weed sprayer for burning weeds.

10. The appliance according to claim 1, wherein the transfer pipe assembly includes at least two interconnecting pipes.

11. A piezoelectric ignition assembly comprising a piezoelectric charge generator coupled by a thermally and electrically-insulated, semi-rigid conductive wire to an electrode within a burner assembly, the burner assembly including a transfer pipe assembly having a proximal end and a distal end, the generator and burning assembly being electrically grounded, the electrode having a stripped tip protruding from a terminal branch of the wire, the wire forming a bent part having at least two bends bracing the wire against the transfer pipe assembly prior to forming the terminal branch, the terminal branch being located midway between the proximate end and the distal end and extending away from the transfer pipe assembly so as to properly distance the stripped tip from the transfer pipe assembly.

12. The piezoelectric ignition assembly according to claim 11, wherein the stripped tip is a distance of between 4 mm and 6 mm from the transfer pipe assembly, preferably 5 mm.

* * * * *